(12) United States Patent
Li et al.

(10) Patent No.: US 7,831,510 B2
(45) Date of Patent: *Nov. 9, 2010

(54) PAYMENT SERVICE TO EFFICIENTLY ENABLE ELECTRONIC PAYMENT

(75) Inventors: David Ching Li, San Jose, CA (US);
David Young-June Kang, San Francisco, CA (US); Benjamin Gregg Listwon, Palo Alto, CA (US); Max R. Levchin, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/416,082

(22) Filed: Mar. 31, 2009

(65) Prior Publication Data
US 2010/0057589 A1    Mar. 4, 2010

Related U.S. Application Data

(63) Continuation of application No. 12/198,664, filed on Aug. 26, 2008, which is a continuation of application No. 10/749,684, filed on Dec. 31, 2003, now Pat. No. 7,457,778.

(60) Provisional application No. 60/456,504, filed on Mar. 21, 2003.

(51) Int. Cl.
*G06Q 40/00* (2006.01)

(52) U.S. Cl. .................... 705/39; 709/217; 709/218

(58) Field of Classification Search .......... None
See application file for complete search history.

(56) References Cited

U.S. PATENT DOCUMENTS 5,778,178 A    7/1998    Arunachalum (Continued)

FOREIGN PATENT DOCUMENTS

WO    WO-2004086190 A3    10/2004

OTHER PUBLICATIONS

Hurley, Nichole; Ragothaman, Srinivasan; An Empirical Analysis of the Security Aspects of E-business Payment Systems, Jun. 2002; South Dakota Business Review; vol. 60, No. 4, pp. 1, 4+.*

(Continued)

*Primary Examiner*—Alexander Kalinowski
*Assistant Examiner*—Virpi H Kanervo
(74) *Attorney, Agent, or Firm*—Schwegman, Lundberg & Woessner, P.A.

(57) ABSTRACT

A method to redirect a browser client is disclosed. The method comprises serving a first web page including a check-out option and receiving a check-out request from a consumer user of an electronic storefront web site. The check-out request is to purchase a product. In response to the check-out request the browser client is redirected to a web page hosted by a payment service web site. The payment service web site stores information that includes a return URL that corresponds to a web-based interface that is hosted by the electronic storefront web site. The redirection further includes a comparison of the return URL in the stored information to a return URL that corresponds to the web-based interface that is hosted by the electronic storefront web site. The comparison is to determine whether redirection to the web-based interface hosted by the electronic storefront web site should be performed.

20 Claims, 4 Drawing Sheets

U.S. PATENT DOCUMENTS

| | | | |
|---|---|---|---|
| 5,796,952 | A | 8/1998 | Davis et al. |
| 5,931,917 | A | 8/1999 | Nguyen et al. |
| 5,983,208 | A | 11/1999 | Haller et al. |
| 5,987,500 | A | 11/1999 | Arunachalam |
| 6,047,268 | A * | 4/2000 | Bartoli et al. ............ 705/35 |
| 6,058,373 | A | 5/2000 | Blinn et al. |
| 6,212,556 | B1 | 4/2001 | Arunachalam |
| 6,324,525 | B1 | 11/2001 | Kramer et al. |
| 6,535,880 | B1 | 3/2003 | Musgrove et al. |
| 6,728,767 | B1 | 4/2004 | Day et al. |
| 6,873,974 | B1 | 3/2005 | Schutzer |
| 7,035,817 | B1 | 4/2006 | Brothers |
| 7,072,856 | B1 | 7/2006 | Nachom |
| 7,072,859 | B1 | 7/2006 | Huber |
| 7,089,208 | B1 | 8/2006 | Levchin et al. |
| 7,110,399 | B2 | 9/2006 | Banerjee et al. |
| 7,191,151 | B1 | 3/2007 | Nosek |
| 7,254,549 | B1 | 8/2007 | Bansal et al. |
| 7,457,778 | B2 | 11/2008 | Li et al. |
| 2001/0018747 | A1 | 8/2001 | Bouthors |
| 2001/0034658 | A1 | 10/2001 | Silva |
| 2002/0016765 | A1 | 2/2002 | Sacks |
| 2002/0083178 | A1 | 6/2002 | Brothers |
| 2002/0107746 | A1 | 8/2002 | Jacoby et al. |
| 2002/0120567 | A1 | 8/2002 | Caplan |
| 2002/0120568 | A1 | 8/2002 | Leblang et al. |
| 2002/0120714 | A1 | 8/2002 | Agapiev |
| 2002/0152163 | A1 | 10/2002 | Bezos |
| 2002/0165821 | A1 | 11/2002 | Tree |
| 2003/0018587 | A1 | 1/2003 | Althoff |
| 2003/0088483 | A1 | 5/2003 | Moyer |
| 2003/0095660 | A1 | 5/2003 | Lee et al. |
| 2004/0078331 | A1 | 4/2004 | Fakih |
| 2004/0098313 | A1 * | 5/2004 | Agrawal et al. ............ 705/26 |
| 2004/0137890 | A1 | 7/2004 | Kalke |
| 2005/0065881 | A1 | 3/2005 | Li et al. |
| 2005/0240518 | A1 | 10/2005 | Ishizuka |
| 2008/0313053 | A1 | 12/2008 | Li et al. |

OTHER PUBLICATIONS

Dias, D.M.; E-commerce Inoperability with IBM's WebSphere Commerce Products; Dec. 31, 2002; IBM Systems Journal; vol. 41, No. 2, p. 272.*

Thomas, B.; Recipe for E-commerce; Nov.-Dec. 1997; IEEE Internet Computing; vol. 1, No. 6, pp. 72-74.*

"U.S. Appl. No. 10/749,684, Notice of Allowance mailed Aug. 5, 2008", 10 pgs.

"U.S. Appl. No. 10/749,684, 312 Amendment mailed Oct. 21, 2008", 8 pgs.

"U.S. Appl. No. 10/749,684, Non Final Office Action mailed Aug. 10, 2007", 23 pgs.

"U.S. Appl. No. 10/749,684, Non-Final Office Action mailed Jan. 29, 2008", 25 pgs.

"U.S. Appl. No. 10/749,684, Response filed Apr. 29, 2008 to Non-Final Office Action mailed Jan. 29, 2008", 7 pgs.

"U.S. Appl. No. 10/749,684, Response filed Nov. 13, 2007 to Non-Final Office Action mailed Aug. 10, 2007", 23 pgs.

"U.S. Appl. No. 12/198,664, Final Office Action mailed Nov. 13, 2009", 17 pgs.

"U.S. Appl. No. 12/198,664, Non Final Office Action mailed May 1, 2009", 15 pgs.

"U.S. Appl. No. 12/198,664, Response filed Jan. 13, 2010 to Final Office Action mailed Nov. 13, 2009", 13 pgs.

"U.S. Appl. No. 12/198,664, Response filed Jul. 9, 2009 to Non Final Office Action mailed May 1, 2009", 11 pgs.

"U.S. Appl. No. 12/198,684, Advisory Action mailed Jan. 29, 2010", 3 pgs.

"Chinese Application No. 200480013900.4, Office Action Mailed Nov. 13, 2009", 5 pgs.

"Chinese Application Serial No. 200480013900.4, Office action mailed May 8, 2009", 9 pgs.

"International Application Serial No. PCT/US04/08683, International Search Report and Written Opinion mailed May 4, 2005", 10 Pages.

Brain, Marshall, "How Internet Cookies Work", [Online]. Retrieved from the Internet: <URL: http://computer.howstuffworks.com/cookie.htm>, (2003), 7 pgs.

Dias, D. M, "E-Commerce Inoperability With IBM's WebSphere Commerce Products", *IBM Systems Journal* vol. 41(2), (Dec. 31, 2002), 272.

Hurley, N., et al., "An Empirical Analysis of the Security Aspect of E-business Payment Systems", *South Dakota Business Reveiew*, vol. 60(4), (Jun. 2002), 1-4.

U.S. Appl. No. 12/198,664, Non-Final Office Action mailed Apr. 1, 2010, 13 pgs.

Chinese Application No. 200480013900.4, Office Action mailed Apr. 14, 2010, 7 pgs.

* cited by examiner

*FIG. 3*

PAYMENT SERVICE TO EFFICIENTLY ENABLE ELECTRONIC PAYMENT

RELATED APPLICATIONS

The application is a continuation application which claims the priority benefit of U.S. application Ser. No. 12/198,664 filed Aug. 26, 2008, entitled "PAYMENT SERVICE," which is a continuation that claims the priority benefit of U.S. application Ser. No. 10/749,684, filed Dec. 31, 2003, issued as U.S. Pat. No. 7,457,778 on Nov. 25, 2008 and, entitled "METHOD AND ARCHITECTURE FOR FACILITATING PAYMENT TO E-COMMERCE MERCHANTS VIA A PAYMENT SERVICE," which claims the priority benefit of U.S. Provisional Application No. 60/456,504, filed on Mar. 21, 2003, entitled "METHOD AND ARCHITECTURE FOR FACILITATING PAYMENT TO E-COMMERCE MERCHANTS VIA A PAYMENT SERVICE," which priority benefit is also claimed, and each of which is incorporated herein in its entirety.

TECHNICAL FIELD

Example embodiments relate to a selective interface display system.

BACKGROUND INFORMATION

The past decade has seen a tremendous growth in the use of the world-wide web for online purchases of products and services. Such products are available via web sites provided by e-commerce merchants, such as electronic retailers. Typically, an e-commerce web site is built around a set of web pages that collectively comprise an "electronic storefront." The web pages generally include an electronic catalog of product offered by the merchant (along with prices), and a product selection scheme that often corresponds to a "shopping cart model." Toward the end of a shopping "experience" the customer is presented with one or more pages corresponding to a "check out" or purchase transaction process. At this time, the customer usually is asked to enter payment information, such as a credit card number and billing address. In some instances, all or part of this information may have been stored during a previous visit and is recalled based on user identification, e.g., through a login process. After the payment information is entered, the customer is able to finalize the transaction via a confirmation action, such as activating a "confirm purchase" button displayed on a corresponding web page.

In most instances, the only payment mechanism offered by e-commerce merchants for retail customers is via credit cards. There are many reasons for this, including increasing the likelihood of receiving payment for the goods, fraud protection, and accounting simplicity. However, credit card payments do not come without a cost. On the merchant side, a transaction fee is subtracted by the credit card operator (e.g., bank) that typically includes a base amount plus a second amount based on a percentage of the overall purchase price (e.g., 1.5-2%). This leads to significant costs for larger merchants. From the consumer's perspective, there are also many drawbacks pertaining to credit card payments. Many consumers are weary about entering credit card information on-line, and thus may not make purchases from e-commerce merchants. Furthermore, many consumers prefer not to use credit cards for purchases, or do not have any credit cards to begin with. Accordingly, it would be advantageous to provide an alternative payment mechanism for both e-commerce merchants and consumers. Ideally, such an alternative payment mechanism should be easy to implement using existing network infrastructure.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 3 shows a web page via which merchants are enabled to specify one or more URLs corresponding to web pages to which the consumer is redirected to during a purchase check out process.

DETAILED DESCRIPTION

Figure 1:
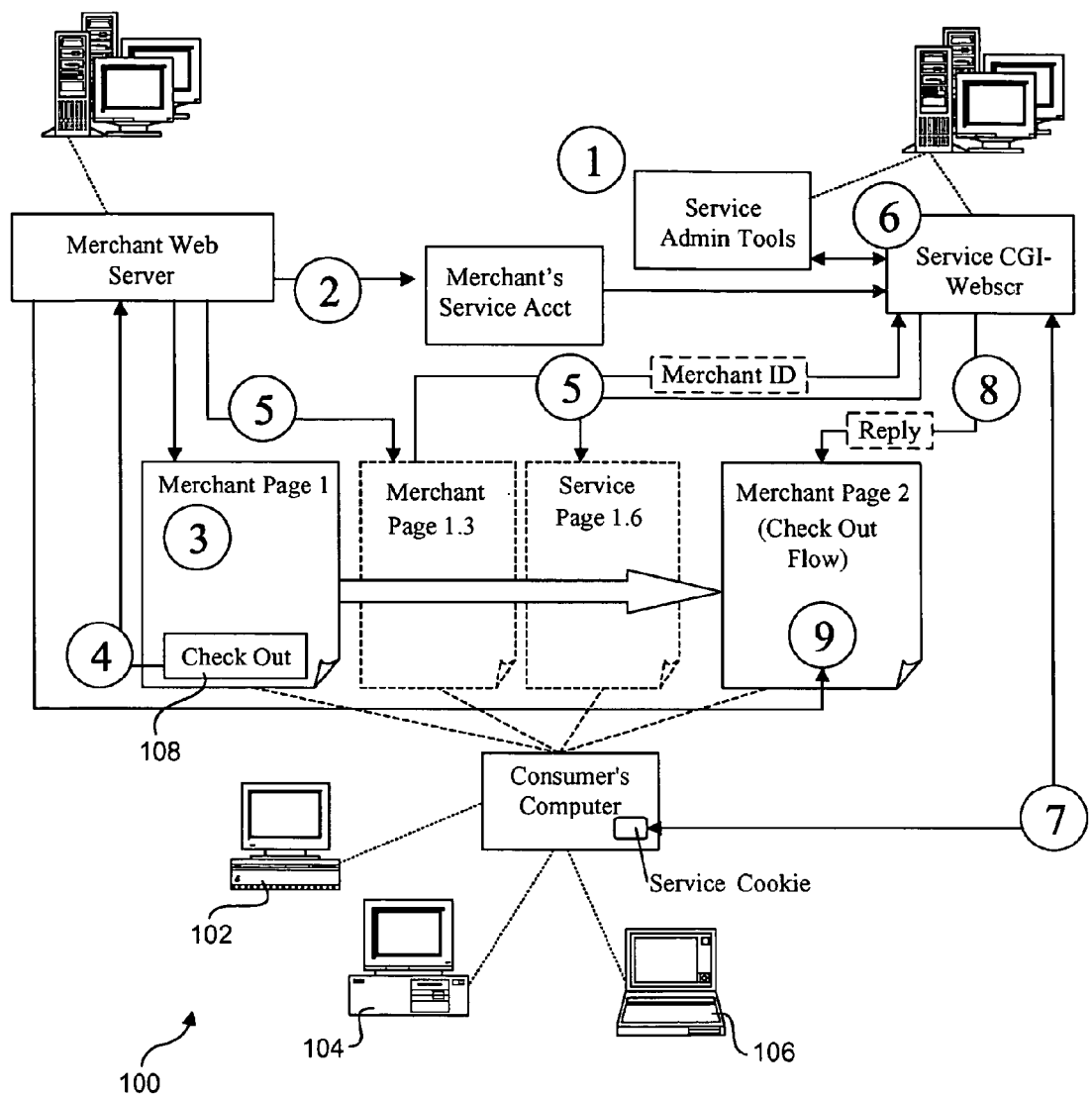
FIG. 1 is an architecture and network flow diagram corresponding to a first scheme for facilitating e-commerce merchant payment via a third-party payment service in accordance with one embodiment the invention.

Embodiments of methods and architectures for facilitating electronic payment of goods and services corresponding to on-line purchases are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the present invention, methods and architectures are disclosed herein for facilitating payment of goods and services via a third-party electronic payment service (i.e., the "payment service" or simply "service"). More particularly, the architectures provide efficient mechanisms for enabling payment of goods and services offered by e-commerce merchants via the payment service on an individual consumer basis. The mechanisms enable e-commerce merchants to easily add payment via the service as an option to authorized customers, and seamlessly integrate transactions via the payment service into the merchant's check out process. Furthermore, the architecture enables identification of consumers who are authorized to use the payment service without requiring the service to disseminate any customer lists or the like to e-commerce merchants that use the mechanisms.

In one embodiment, the mechanism is facilitated via an application program interface (API) and corresponding cookies relating to the API and use of the payment service. A service cookie is sent to the consumer's computer (and subsequently stored thereon) when the consumer logs into the payment service's website. For example, when a consumer signs up to use the payment service, a service cookie is sent back to the consumer's device (e.g., computer) to be stored on that device by a browser. The cookie is then used to facilitate future transactions via the service. Based on the existence of the service cookie, the service can determine whether the consumer has ever successfully logged into the service website. If an appropriate cookie has been sent to the consumer (actually the device), indicating the consumer is authorized to use the service, the service will advise the merchant, via the API, to allow the consumer to use the payment service for a current purchase. Accordingly, the merchant will present a checkout process congruent with the use of the service as a payment option.

Figure 2:
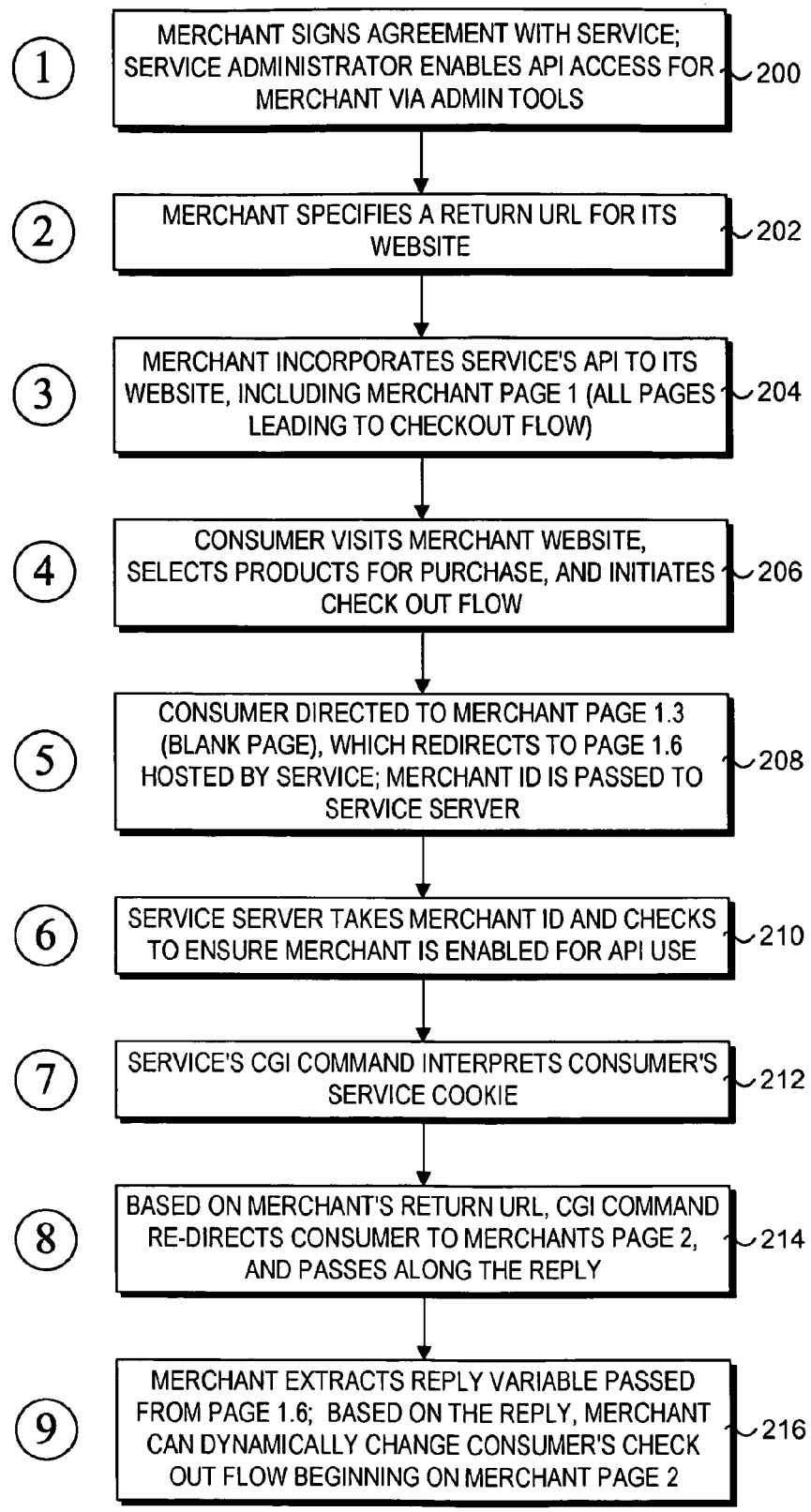
FIG. 2 is a flowchart illustrating further details of operations performed by the architecture of FIG. 1 during a consumer purchase from an e-commerce site.

An architecture and process flow diagram 100 corresponding to one embodiment of the invention is shown in FIG. 1, while a flowchart further describing the operations performed via the architecture is shown in FIG. 2. The process begins in a block 200 in which the merchant signs an agreement with the payment service to use the payment service API for facilitating consumer payment via the service. An administrator or the like at the payment service then enables the merchant for API access. In one embodiment the merchant is enabled for API access via an admin tool that is used to administrate user's accounts.

Figure 3:
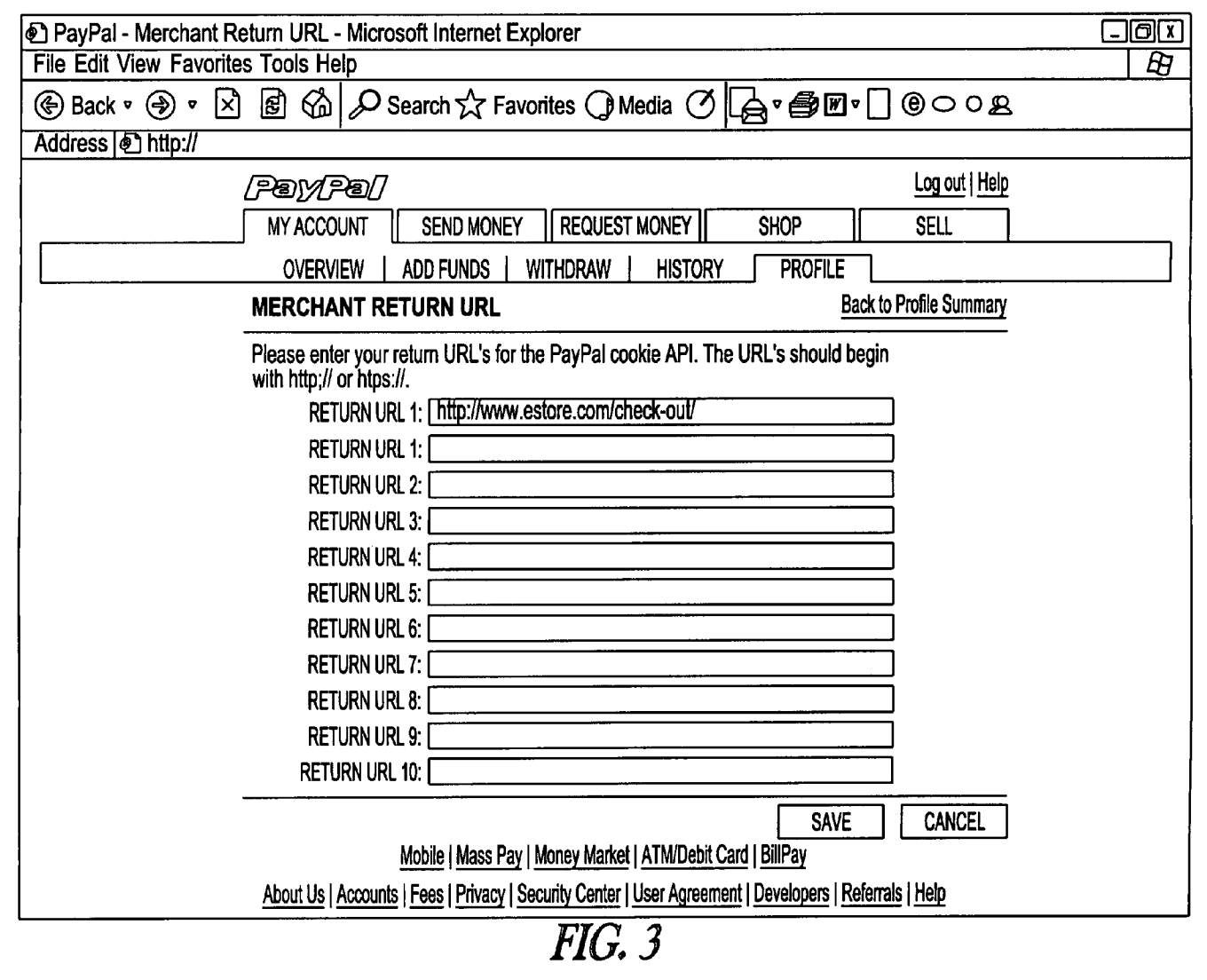

Next, in a block 202, the merchant specifies a return URL for its website. In one embodiment user's of the payment service, including merchants, are enabled to provide one or more return URLs for respective sites operated by the merchant via a user profile page hosted by the service, such as depicted in FIG. 3. The merchant simply enters the URL address for each web page that merchant wants the flow to be re-directed from the payment service site, as described below in further detail.

The final step for enabling use of the API is completed when the merchant incorporates the payment service's API into appropriate web pages on its web site, as depicted by a block 204. These web pages will typically include one or more pages leading to a check out flow for the site. The one or more pages are collectively represented by merchant page 1 in FIG. 1—it will be understood that the provisions discussed below corresponding to merchant page 1 should be included in each of the web pages corresponding to the initial portion of a check out process. At this point, the merchant and service websites are configured to facilitate consumer payments via the payment service.

During subsequent ongoing operations, various consumers are enabled to provide payment for products purchased from the merchant via the payment service in the following manner. Generally, consumer's will access the merchant website via a web-enabled device, such as a Macintosh computer 102, personal computer (PC) 104, and laptop 106 depicted in FIG. 1. It is noted that these are merely exemplary web-enabled devices that consumer may use, with other devices including but not limited to PDA's, pocket PC's, web-enabled phones, workstations, etc. For clarity, augmentations to the network architecture for supporting non-HTML browsers, such as the micro-browsers used in PDA's and web-enabled phones, are not shown or discussed herein; infrastructure for extending web access to such devices are well-known in the art.

Continuing in a block 206, a consumer operating the web-enabled device, visits the merchant's website and selects one or more products for purchase, e.g., via "placing" the products in an electronic shopping cart. The consumer then initiates the site's check out process by activating an appropriate button displayed on Merchant page 1, such as a "Check Out" button 108. In response, a set of operations corresponding to blocks 208, 210, 212, and 214 are performed substantially instantly in a manner that is transparent to the consumer.

First, in block 208 the consumer (i.e., the browser on the consumer's device) is directed to merchant page 1.3, which comprises a blank page (with regard to visual content). Merchant page 1.3 is embedded with code to redirect the device's browser to page 1.6 hosted by the payment service. During this operation, information identifying the merchant (i.e., a merchant ID) is passed from the merchant's web server to the service's server. For example, in one embodiment, the browser is redirected to the service's server using a URL having the following format:

https://<service_web_address>/cgi-bin/
webscr?cmd=_user-
check&MID=X@Y.com&URL=http://www.Y.com/
cgi-bin/checkoutpg2 where <service_web_address> is the address for the payment service's home page, and "MID" is the merchant ID with the payment service, which in the current example comprises a primary email address (X@Y.com) of the merchant. "URL" is the return URL of the web page to where the consumer user is to be redirected to.

Upon receiving the merchant ID, the service server checks its user profile data to verify that the merchant is enabled for API use in block 210. In one embodiment, data embedded in the foregoing URL format provides a built-in security measure, wherein the MID and URL values are checked against user profile information for the merchant to authenticate the request. Accordingly, if the merchant decides to rename its "page 2" URL, the merchant will need to update the corresponding URL entered in the user profile above in connection with block 202 and FIG. 3. If the merchant is not enabled, an indicator is sent back to the merchant server indicating such via the reply discussed below.

Upon verifying that the merchant is enabled for API use, a CGI (common gateway interface) command (script) is executed on the service's server to interpret the consumer's service cookie. In conjunction with the redirect to service URL above, the browser on the consumer's device automatically forwards a copy of the cookie back to the service server. This is a process that is automatically performed by modern browser's that support cookies in response to being directed to a website that issued the cookie, and does not require any modification on the client (i.e., consumer device) side. In essence, a cookie is merely a pied of text that a web server sends to a client (e.g., a browser running on the consumer's device) to have stored on the client for subsequent use. Each cookie contains information comprising name-value pairs that may be used by the issuing web site during subsequent interactions with the site to transfer information to the site without requiring any action by the user. Typically, such information includes user ID's and the like.

Based on the merchant's return URL, the CGI command redirects the browser back to the merchant's web server to merchant page 2, which begins the augmented check out flow. In conjunction with this, a reply is passed to the server (e.g., embedded as a variable in a pre-formatted URL in one embodiment) that indicates whether or not the consumer is authorized to use the payment service. In one embodiment respective reply variable values are also used to indicate an authentication failure and a cookie cannot be interpreted.

The merchant server extracts the reply variable passed from service page 1.6 and dynamically changes the flow of the check out process beginning at merchant page 2. For example, if a cookie is not received from the consumer's device, the consumer is not authorized to use the payment service. Accordingly, the reply will indicate such, and the portion of the check out flow beginning with merchant page 2 will continue with a check out process that doesn't present the consumer with an option to pay via the payment service. In contrast, if the reply indicates the consumer is an authorized user, the merchant page 2 will lead to one or more subsequent pages (not shown) that will enable the user to pay for the purchase via the payment service. Typically, these pages will be coded by the merchant to fit the particular check-out process preferred by the merchant. Generally, the checkout process will perform a behind-the-scenes interaction with the payment service to complete a payment transaction in response to a consumer's authorization to pay for the product using the payment service. Further details of this process are known in the art, and, as such, are not disclosed herein.

The foregoing scheme provides an efficient mechanism for enabling e-commerce merchants to offer purchase payments via third-party payment services. This is advantageous to both the merchant and consumers. The cost associated with credit card transactions fees are eliminated for most payment service transactions. Like credit cards, payments issued by the payment services are trustworthy. Consumers also enjoy the benefit of being able to purchase products on-line in a secure manner that doesn't require disclosure of credit card information, or even require the consumer to possess a credit card.

Exemplary Server Computer System

Figure 4:
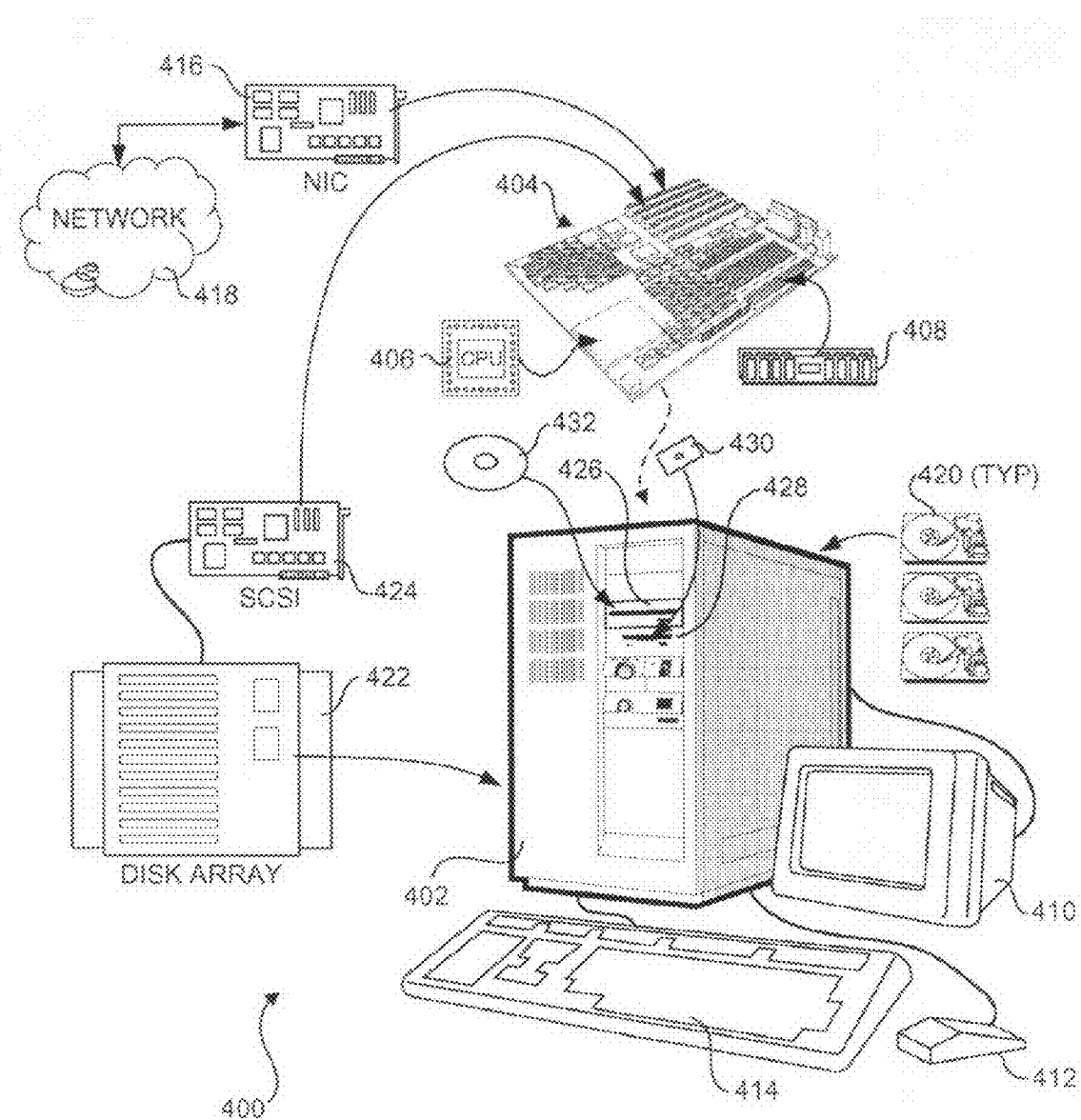
FIG. 4 is a schematic diagram illustrating a conventional computer server that is suitable for practicing embodiments of the invention disclosed herein.

With reference to FIG. 4, a generally conventional computer server 400 is illustrated, which is suitable for use in connection with practicing the embodiments of the present invention discussed above. For example, computer server 400 may be used for running software modules and components on the merchant web server and service server to facilitate the operations in the flow diagrams and flowcharts discussed above. Examples of computer systems that may be suitable for these purposes include stand-alone and enterprise-class servers operating UNIX-based and LINUX-based operating systems, as well as servers running the Windows NT or Windows 2000 Server operating systems.

Computer server 400 includes a chassis 402 in which is mounted a motherboard 404 populated with appropriate integrated circuits, including one or more processors 406 and memory (e.g., DIMMs or SIMMs) 408, as is generally well known to those skilled in the art. A monitor 410 is included for displaying graphics and text generated by software programs and program modules that are run by the computer server. A mouse 412 (or other pointing device) may be connected to a serial port (or to a bus port or USB port) on the rear of chassis 402, and signals from mouse 412 are conveyed to the motherboard to control a cursor on the display and to select text, menu options, and graphic components displayed on monitor 410 by software programs and modules executing on the computer. In addition, a keyboard 414 is coupled to the motherboard for user entry of text and commands that affect the running of software programs executing on the computer. Computer server 400 also includes a network interface card (NIC) 416, or equivalent circuitry built into the motherboard to enable the server to send and receive data via a network 418, such as the Internet, enabling the server to be connected to the world-wide web.

File system storage for storing server-side data, such as user profiles, electronic catalogs, CGI scripts, etc. may be implemented via a plurality of hard disks 420 that are stored internally within chassis 402, and/or via a plurality of hard disks that are stored in an external disk array 422 that may be accessed via a SCSI card 424 or equivalent SCSI circuitry built into the motherboard. Optionally, disk array 422 may be accessed using a Fibre Channel link using an appropriate Fibre Channel interface card (not shown) or built-in circuitry. Other hard disk interfaces may also be used.

Computer server 400 generally may include a compact disk-read only memory (CD-ROM) drive 426 into which a CD-ROM disk may be inserted so that executable files and data on the disk can be read for transfer into memory 408 and/or into storage on hard disk 420. Similarly, a floppy drive 428 may be provided for such purposes. Other mass memory storage devices such as an optical recorded medium or DVD drive may also be included. The machine instructions comprising the software components that cause processor(s) 406 to implement the operations of the embodiments discussed above will typically be distributed on floppy disks 430 or CD-ROMs 432 (or other memory media) and stored in one or more hard disks 420 until loaded into memory 408 for execution by processor(s) 406. Optionally, the machine instructions may be loaded via network 418 as a carrier wave file.

Thus, embodiments of this invention may be used as or to support a software program executed upon some form of processing core (such as the CPU of a computer) or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A computer implemented method to redirect a browser client, the method comprising:

serving, using one or more processors, a first web page containing visual content including a check-out option;

receiving, using the one or more processors, a check-out request from a consumer user of an electronic storefront web site to purchase one or more products from the electronic storefront web site;

redirecting, using the one or more processors, the browser client to a payment service web site that stores information that includes a return URL (uniform resource locator) corresponding to a web-based interface that is hosted by the electronic storefront web site, the payment service web site to extract the return URL embedded in the information and to compare the extracted return URL to a reference return URL to determine whether redirection to the web-based interface hosted by the electronic storefront web site should be performed, the payment service web site further to redirect the browser client to the web-based interface hosted by the electronic storefront web site; and serving, using the one or more processors, the web-based interface hosted by the electronic storefront web site to the browser client used by the consumer user.

2. The computer implemented method of claim 1, further comprising:

selecting a merchant identity (ID) for the electronic storefront web site to be used for transactions involving the payment service web site; and providing the merchant ID to the payment service web site.

3. The computer implemented method of claim 2, wherein the providing of the merchant ID to the payment service web site includes communicating a URL (uniform resource locator).

4. The computer implemented method of claim 1, further comprising generating the web-based interface hosted by the electronic storefront web site using an application program interface (API) that is provided to the electronic storefront web site by the payment service web site.

5. The computer implemented method of claim 1, further comprising serving a web-based interface to the browser client that does not include an option to enable the consumer user to make payment of the one or more products via the payment service web site.

6. The computer implemented method of claim 1, further comprising receiving an interface to enable an administrator to register a plurality of return URLs with the payment service web site.

7. The computer implemented method of claim 6, wherein the plurality of return URLs respectively correspond to a plurality of web pages hosted by the electronic storefront website.

8. The computer implemented method of claim 1, further comprising receiving a reply that indicates the consumer user is authorized to use the payment service.

9. A machine readable media storing instructions that, when executed by a machine, cause the machine to perform following steps:

serving a first web page containing visual content including a check-out option;

receiving a check-out request from a consumer user of an electronic storefront web site to purchase one or more products from the electronic storefront web site;

redirecting a browser client to a payment service web site that stores information including a return URL (uniform resource locator) corresponding to a web-based interface that is hosted by the electronic storefront web site, the payment service web site to extract the return URL embedded in the information and to compare the extracted return URL to a reference return URL to determine whether redirection to the web-based interface hosted by the electronic storefront web site should be performed, the payment service web site further to redirect the browser client to the web-based interface hosted by the electronic storefront web site; and serving the web-based interface hosted by the electronic storefront web site to the browser client used by the consumer user.

10. A computer implemented method to redirect a browser client, the method comprising:

storing, using one or more processors, information at a payment service web site responsive to a redirection of the browser client to the payment service web site from an electronic storefront web site, information including a return URL (uniform resource locator) corresponding to a web-based interface hosted by the electronic storefront web site, the storing being performed responsive to a check-out request that is received at the electronic storefront web site to purchase one or more products from the electronic storefront web site, the receipt of the check-out request at the electronic storefront web site to cause the redirection of the browser client to the payment service web site;

extracting, using the one or more processors, the return URL embedded in the information;

comparing, the one or more processors, the extracted return URL to a reference return URL, corresponding to the web-based interface hosted by the electronic storefront web site, to determine whether redirection to the web-based interface hosted by the electronic storefront web site should be performed; and redirecting, the one or more processors, the browser client to the web-based interface hosted by the electronic storefront web site.

11. The computer implemented method of claim 10, further comprising authenticating the electronic storefront web site.

12. The computer implemented method of claim 11, wherein the authenticating the electronic storefront web site further comprises:

receiving a merchant identity (ID) from the electronic storefront web site; and identifying the merchant ID in a merchant profile that is associated with a merchant to authenticate the merchant as enabled for transactions including the payment service web site.

13. The computer implemented method of claim 12, wherein the merchant ID includes an email address.

14. The computer implemented method of claim 12, wherein the merchant ID is provided to the payment service web site via a URL (uniform resource locator).

15. The computer implemented method of claim 10, further including providing an API (application program interface) to the electronic storefront web site.

16. The computer implemented method of claim 10, wherein the web-based interface hosted by the electronic storefront web site does not include an option to enable a consumer user to make payment of the one or more products via the payment service web site.

17. The computer implemented method of claim 10, further comprising communicating an interface to enable an administrator for the electronic storefront web site to register a plurality of reference return URLs with the payment service web site.

18. The computer implemented method of claim 17, wherein the plurality of reference return URLs respectively correspond to a plurality of web pages hosted by the electronic storefront.

19. The computer implemented method of claim 10, further comprising communicating a reply that includes an authorization to use the payment service.

20. A machine readable media storing instructions that, when executed by a machine, cause the machine to perform following steps:

storing information at a payment service web site responsive to a redirection of a browser client to the payment service web site from an electronic storefront web site, the information including a return URL (uniform resource locator) corresponding to a web-based interface hosted by the electronic storefront web site, the storing responsive to a check-out request that is received at the electronic storefront web site to purchase one or more products from the electronic storefront web site, the receipt of the check-out request at the electronic storefront web site to cause the redirection of the browser client to the payment service web site;

extracting the return URL embedded in the information;

comparing the return URL that is extracted to a return URL corresponding to the web-based interface hosted by the electronic storefront web site to determine whether redirection to the web-based interface hosted by the electronic storefront web site should be performed; and redirecting the browser client to the web-based interface hosted by the electronic storefront web site.

* * * * *